United States Patent [19]

Hinkle

[11] 4,188,995
[45] Feb. 19, 1980

[54] APPARATUS FOR THE CYCLIC HEATING AND COOLING OF PROCESSING EQUIPMENT

[75] Inventor: Richard E. Hinkle, Bayshore, N.Y.

[73] Assignee: American Hydrotherm Corporation, New York, N.Y.

[21] Appl. No.: 833,721

[22] Filed: Sep. 16, 1977

Related U.S. Application Data

[62] Division of Ser. No. 690,166, May 26, 1977, Pat. No. 4,071,075.

[51] Int. Cl.² .............................................. F25B 13/00
[52] U.S. Cl. ..................................................... 165/64
[58] Field of Search ...................... 165/1, 2, 18, 61, 64

[56] References Cited

U.S. PATENT DOCUMENTS

| | | | |
|---|---|---|---|
| 3,109,486 | 11/1963 | Hansen | 165/1 |
| 3,525,098 | 8/1970 | Vox | 165/2 |
| 3,556,201 | 1/1971 | Sander | 165/2 |
| 3,953,973 | 5/1976 | Cheng | 165/2 |
| 4,020,895 | 5/1977 | Schafer | 165/2 |
| 4,026,347 | 5/1977 | Schafer | 165/2 |

Primary Examiner—William L. Freeh

[57] ABSTRACT

There is disclosed a process and apparatus for the cyclic heating and cooling of processing equipment with a pressurized heat transfer fluid i.e., water, utilizing heat exchangers for the separate heating and cooling of the heat transfer fluid and including at least two heat recovery vessels wherein heat transfer fluid is stored in such vessels during initial phases of a subsequent cycle whereby heat transfer fluid at an intermediate temperature level in one vessel is passed through such processing equipment prior to the passage of heated or cooled heat transfer fluid from one of such heat exchangers through such processing equipment.

4 Claims, 2 Drawing Figures

APPARATUS FOR THE CYCLIC HEATING AND COOLING OF PROCESSING EQUIPMENT

This is a division of application Ser. No. 690,166, filed May 26, 1977 now U.S. Pat. No. 4,071,075.

FIELD OF THE INVENTION

This invention relates to a process and apparatus for heating and cooling processing equipment, and more particularly to a process and apparatus for the cyclic heating and cooling of processing equipment utilizing pressurized water as the heat transfer fluid.

BACKGROUND OF THE INVENTION

In processing equipment, such as platen presses for producing decorative melamine and formaldehyde laminates, requiring alternate heating and cooling modes, most of the energy requirements are for heating the processing equipment rather than heating the material being processed. Furthermore, the alternate heating and cooling of such a heat transfer fluid adds substantially to the energy requirements of the process.

Early efforts to conserve heat were relatively simple. For example, at the end of a heating cycle, the hot fluid was set aside for use in heat-up of the next cycle and in like manner, at the end of a cooling cycle, the cold fluid was set aside and stored for use in cool-down at the start of a subsequent cooling cycle. This was facilely accomplished with an unpressurized water by use of separate vessels for the hot and cold fluid, however, with a pressurized water, the same vessel must be used, alternating hot and cold fluids and thereby introducing inefficiencies as a result of cross mixing.

In U.S. Pat. No. 3,109,486, there is disclosed a system including a "regenerative" section which contained relatively cooler water during the heating cycle which, on the start of a cooling cycle, is pumped through a heat exchanger for further cooling and thence through the processing equipment wherein heat is exchanged by the fluid while cooling the equipment. The fluid is then returned to the regenerative section. When the water temperature leaving the processing equipment becomes too low to be economically stored, the regenerative section is then bypassed. Thus, at the end of the cooling cycle, the regenerative section contains hot water originally in the piping and equipment plus some additional water which has first been cooled and then reheated in cooling the equipment. The cycle is similar on heating, except that relatively warmer water in the regenerative section is upwardly displaced into the main section of the accumulator with the hottest water from the accumulator being circulated through the press, cooled and returned to the regenerative section.

The heat saved during a heating cycle is readily calculated by multiplying the mass of high pressure water in the regenerative section by the specific heat and the temperature difference between the start and finish of the heating cycle. The efficiency is adversely affected by using hottest water at the beginning of a heating cycle and cooling water before introduction during a cooling cycle, i.e., inefficiencies result by using heated or cooled water over large temperatures.

OBJECTS OF THE INVENTION

It is an object of the present invention to provide a novel process and apparatus for heating and cooling processing equipment.

Another object of the present invention is to provide a novel process and apparatus for heating and cooling processing equipment to substantially reduce over-all energy requirements.

Still another object of the present invention is to provide a novel process and apparatus for heating and cooling processing equipment to materially reduce piping, valving and equipment requirements.

Various other objects and advantages of the present invention will become apparent from the following detailed description of an exemplary embodiment thereof with the novel features thereof being particularly pointed out in the appended claims.

SUMMARY OF THE INVENTION

In accordance with the present invention, there is provided for processing equipment to be heated and cooled, heat exchangers for separately heating and cooling pressurized water, i.e. water under a pressure of at least about 30 psig, and including at least two heat recovery vessels wherein pressurized water is stored in such vessels during initial phases of one cycle for use during initial phases of a subsequent cycle whereby heat transfer fluid at an intermediate temperature level in one of such vessels is passed through the processing equipment prior to the passage of heated or cooled pressurized water from one of such heat exchanger through such processing equipment, as more clearly hereinafer disclosed. In accordance with my invention, the efficiency of heat recovery is substantially improved (40 to 45%) by such two stage change of water whereby water in the processing equipment is first displaced by tempered water from a first vessel and then replacing the tempered water after exchanging heat with the equipment, with water which is fully heated or cooled with such tempered water being stored in a second vessel, as distinguished from no recovery system, and substantially improves the effectiveness (at least about 100%) as compared with a recovery system, such as disclosed in the hereinabove mentioned Hanson reference.

In exchanging heat with the process equipment, the tempered water can be heated to a higher temperature while cooling the equipment and cooled to a lower temperature in heating the equipment than could fully heated or fully cooled water. Since the quantity of heat recovered varies with the difference between the two final temperatures, heat is more efficiently recovered.

The volume of each of the recovery vessels is between 75 to 125 percent preferably substantially about equal to the volume of the heat transfer conduits within the processing equipment and the volume of conduits to and from such processing equipment.

DESCRIPTION OF THE DRAWING

The invention will be more clearly understood by reference to the following detailed description of the preferred embodiment thereof when taken in conjunction with the accompanying drawing wherein.

DETAILED DESCRIPTION OF THE INVENTION

Figure 1:
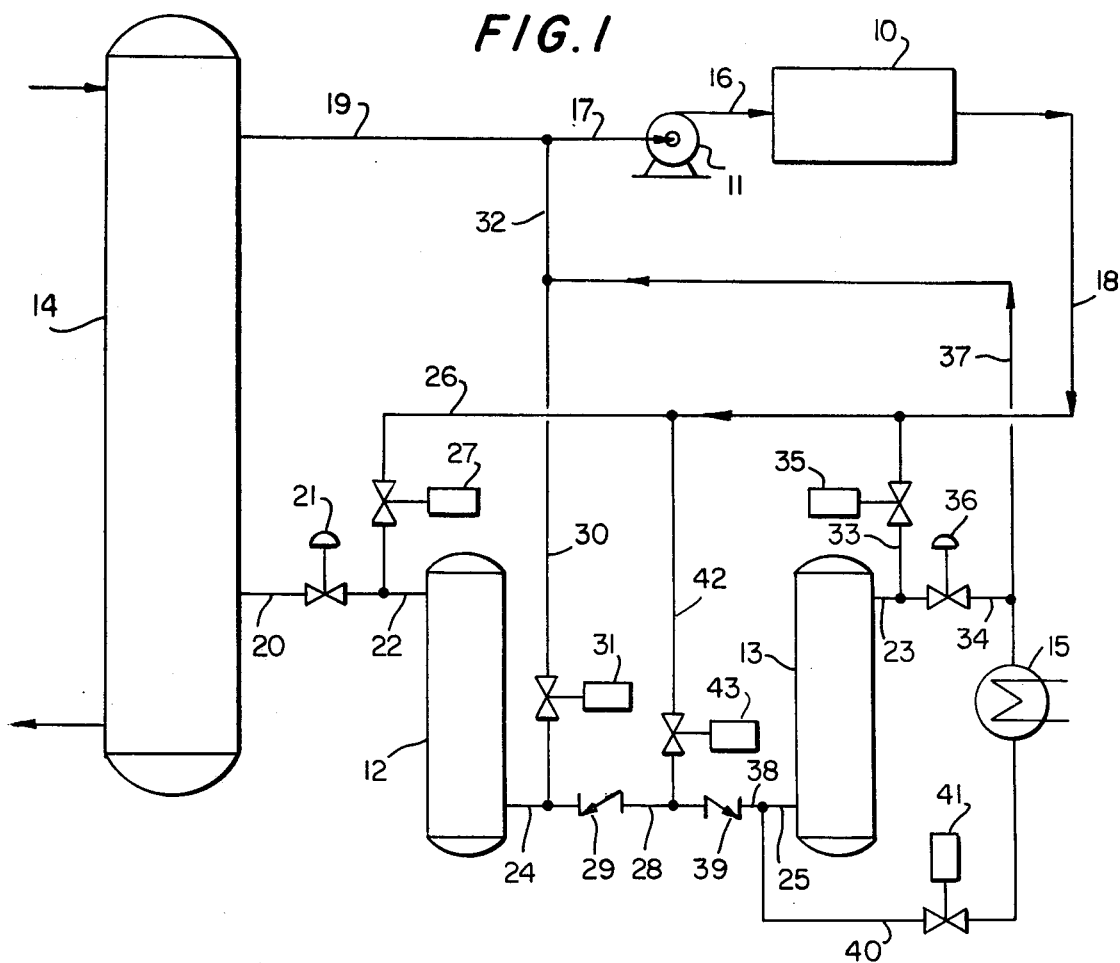
FIG. 1 is a schematic flow diagram thereof.

Referring now to FIG. 1, the process and apparatus for heating and cooling processing equipment includes user equipment, generally indicated as 10, such as platen press for decorative laminates, a pump 11, heat recovery vessels 12 and 13, hot accumulator tank 14 and a cooler 15. The user equipment 10 is connected to the discharge side of the pump 11 by a conduit 16 with the suction side of the pump 11 being connected to a conduit 17. The downstream side of the user equipment 10 is connected to a conduit 18. The outlet of the hot accumulator tank 14 is connected by a conduit 19 to the conduit 17 with the inlet to the hot accumulator tank 14 being connected to a conduit 20 under the control of valve 21.

The heat recovery vessels 12 and 13 are provided with upper conduits 22 and 23 and lower conduits 24 and 25, respectively. The upper conduit 22 of the heat recovery vessel 12 is connected to the conduit 20 and to a conduit 26 under the control of valve 27 with conduit 26 being connected to the conduit 18. The lower conduit 24 of the heat recovery vessel 12 is connected to a conduit 28 under the control of a one way valve 29 and to a conduit 30 under the control of valve 31 with conduit 30 being connected by a conduit 32 to the conduit 17.

The upper conduit 23 of the heat recovery vessel 13 is connected to conduits 33 and 34 under the control of valves 35 and 36, respectively. The conduit 33 is connected to conduit 18 with conduit 34 being connected to a conduit 37 which is in fluid communication with the downstream side of the cooler 15 and the conduit 33. The lower conduit 25 of the heat recovery vessel 13 is connected to a conduit 38 under the control of a one way valve 39 and to a conduit 40 under the control of valve 41 with the conduit 40 being in fluid communication with the inlet to the cooler 15. A conduit 42 under the control of valve 43 is connected to the conduits 28 and 38 and to the conduits 18 and 26.

In operation, assuming initiation of a heating cycle in tempered water has been previously stored in the vessel 13, in a first stage of a heating cycle, the suction side of the pump 11 is placed in fluid communication with the upper portion of the heat recovery vessel 13 via conduits 23, 34, 37, 32 and 17 by opening the valve 36. The discharge side of the pump 11 is in fluid communication with the user equipment 10 by the conduit 16 with the downstream side of the user equipment being in fluid communication with the lower portion of the heat recovery vessel 13 via conduits 8, 42, 38 and 25 by opening valve 43 whereby tempered water in the upper portion of the vessel 13 is caused to be displaced by cooler water flowing upwardly within the heat recovery vessel 13 since the user equipment had been operating within final stages of the cooling cycle.

As hereinabove mentioned, the volume of the heat recovery vessels 12 and 13 between 75 to 125 percent, preferably substantially about equal to the volume of the heat transfer conduits within the user equipment 10 and the conduits to and from such user equipment. Thus, after a corresponding volumetric replacement, the valve 36 is closed and the valve 21 is opened to permit initiation of a second stage of the heating cycle whereby hot water from the accumulator tank 14 is introduced via conduits 19, 17 and 16 into the user equipment 10. Tempered cold water is withdrawn from user equipment 10 via conduits 18, 42, 28 and 24 and is introduced into the lower portion of the heat recovery vessel 12 to displace upwardly hotter water from the upper portion of the heat recovery vessel 12 into the accumulator tank 14. Second stage heating is effected for a time sufficient to volumetric similarly substantially replace the pressurized water in the heat transfer conduits of the user equipment as well as the associated conduits. It will be appreciated that heat-up times are improved by passing the water stored in vessel 12 to hot accumulator tank 14 vice passage through the user equipment.

The final stage of the heating cycle is effected by closing valve 43 and opening valves 27, 36 and 35 whereby hot heat transfer fluid is withdrawn from the accumulator tank 14 by conduit 19 and combined in conduit 17 with recirculating heat transfer medium in conduit 32 and introduced by conduit 16 into user equipment 10. The heat transfer fluid withdrawn from the user equipment 10 in conduit 18 is split with a portion being passed to hot accumulator tank 14 by conduits 26 and 20 with the remaining portion by-passing accumulator tank 14 by being passed by conduits 33, 34, and 37 to conduit 32 as the recirculating heat transfer fluid. The amount of heat transfer fluid by-passing the hot accumulator tank 14 increases as the desired temperature level is reached with concomitant reductions in the flow of fluid from accumulator tank 14.

After a time period determined by the capabilities of the user equipment 10 with regard to the materials being treated, the heating cycle is stopped and first stage of the cooling cycle is initiated. Accordingly, valve 21, 35 and 36 are closed and valve 31 is opened to permit hot heat transfer fluid from the user equipment 10 to be introduced by conduits 18, 26, and 22 into the upper portion of the heat recovery vessel 12 to displace downwardly thereby tempered colder heat transfer fluid therein, such displaced fluid being passed to the user equipment 10 by conduits 24, 30, 32, 17 and 16.

As hereinabove discussed with respect to first and second stages of the heating cycle, after a volume of heat transfer fluid is displaced equal to from 75 to 125 percent preferably substantially equal to the volume of fluid in the user equipment 10 and related conduits, the second stage of the cooling cycle is initiated by closing valves 27 and 31 and by opening valves 35 and 41. Cooled heat transfer fluid is passed by conduits 37, 32, 17 and 16 to user equipment 10 with tempered hot fluid introduced into the upper portion of heat recovery vessel 13 to downwardly displace cold water which is passed to cooler 15 by conduit 40.

After a similar volumetric change, the final stage of the cooling cycle is effected by closing valve 35 and opening valve 43 whereby cooled heat transfer fluid is passed to user equipment 10 from cooler 15 by conduits 37, 32, 17 and 16 with tempered heat transfer fluid being returned to cooler 15 by conduits 18, 42, 38 and 40. After a time period similarly dictated by process requirements, the cooling cycle is discontinued and the heating cycle initiated as hereinabove discussed.

As will be appreciated by one skilled in the art, when introducing a hot heat transfer fluid into a recovery vessel, the hot fluid is into the upper portion thereof to thereby downwardly displace relatively cooler heat transfer fluid whereas when introducing cool heat transfer fluid into a heat recovery vessel, the cooled fluid is introduced into the lower portion thereof to thereby upwardly displace warmer water. It will be further appreciated by one skilled in the art that mixing in the heat recovery vessels of the heat transfer medium at various temperature levels during fluid should be minimized. In this regard, one aspect of the present invention is concerned with minimizing the mixing of heat transfer fluid at various temperature levels.

Figure 2:
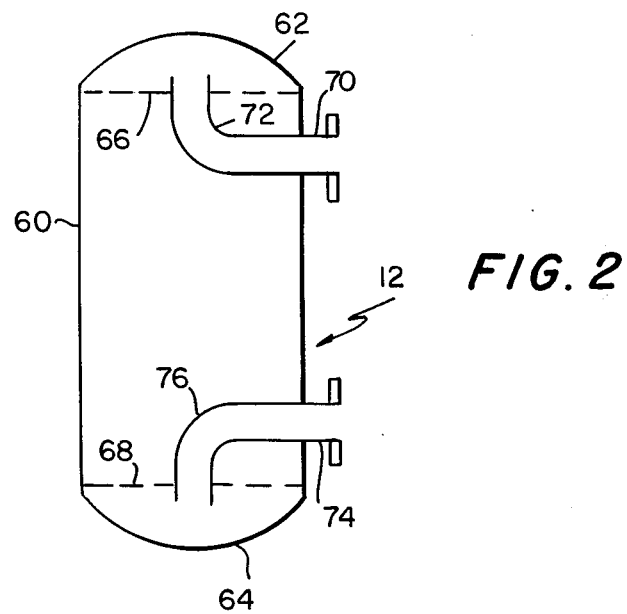
FIG. 2 is a schematic cross section of a heat recovery vessel.

Referring to FIG. 2, there is illustrated a heat recovery vessel generally indicated as 12 formed by vertically disposed drum 60 enclosed by top and bottom walls 62 and 64, respectively. Proximate to the top and bottom walls 62 and 64, there are positioned horizontally disposed perforated distribution plates 66 and 68, respectively. A horizontally-disposed conduit 70 is mounted on the drum 60 at a point below and proximate to the upper perforated distribution plate 66 and is formed with an elbow 72 extending upwardly through and terminating above the upper perforated distribution plate 66. A horizontally-disposed conduit 74 is mounted on the drum 60 at a point above and proximate to the lower perforated distribution plate 68 and is formed with an elbow 76 extending downwardly through and terminated below the lower perforated distribution plate 68. It will be readily appreciated by one skilled in the art that the introduction and withdrawal of a fluid from such a vessel will minimize convection currents therein. It will be further understood that the vessels are completely filled in operation since the process and apparatus of the present invention relates to the use of water as the heat transfer fluid under pressures of at least above about 30 psig.

The time of a complete cycle (heating, cooling and molding) will vary depending on platen size, materials being treated, the number of layers of materials, etc. Generally, cycle times are about an hours duration and can be as low as twenty minutes for laminating a plastic to a plywood substrate.

The invention has been described with reference to the use of pressurized water as the heat transfer fluid, however, it will be appreciated that other heat transfer fluids may be used. The use of another heat transfer fluid is not contemplated except for a use requiring large temperature range, since such use is inefficient requiring extra volumes of fluid to the system as a result the specific heat of such heat transfer fluids.

EXAMPLE OF THE INVENTION

A 5'×12' platen press having 22 openings is operated with a heat requirement of $10.84 \times 10^6$ B.T.U. per cycle within a temperature range of from 90° to 290° F. Use of the process and apparatus of the present invention reduces heat requirements to $6.44 \times 10^6$ B.T.U. per cycle as compared to estimated heat requirements of 8.8 B.T.U. per cycle for a system like the one disclosed in the hereinabove mentioned Hanson patent. Savings in energy requirements in the first year are greater than the additional equipment costs to effect such efficiencies.

While not fully illustrated, the valving arrangement includes automatic on-off and modulating valves in combination to minimize valve requirements.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

I claim:

1. An apparatus for heating and cooling user equipment utilizing pressurized water as a heat transfer fluid in a closed system wherein said system includes heating and cooling means for heating and cooling said heat transfer fluid and wherein said apparatus includes at least two storage vessels for storing heat transfer fluid at intermediate temperature levels which comprises:
   (a) pump means for passing said heat transfer fluid through said apparatus;
   (b) conduit means for introducing heat transfer fluid from an upper portion of a first stage vessel into said user equipment during a first stage of a heating cycle;
   (c) conduit means for introducing heat transfer fluid withdrawn from said user equipment into a lower portion of said first storage vessel;
   (d) conduit means for introducing heat transfer fluid from said heating means into said user equipment during a second stage of said heating cycle;
   (e) conduit means for introducing heat transfer fluid withdrawn from said user equipment during said second stage of said heating cycle into a lower portion of a second stage storage vessel;
   (f) conduit means for passing heat transfer fluid from said second storage vessel to said heating means;
   (g) conduit means for passing heat transfer fluid withdrawn from said user equipment to said heating means during a final stage of said heating cycle;
   (h) conduit means for introducing heat transfer fluid withdrawn from said user equipment into said upper portion of said second storage vessel during a first stage of a cooling cycle;
   (i) conduit means for passing heat transfer fluid from said second storage vessel to said user equipment;
   (j) conduit means for introducing heat transfer fluid from said cooling means into said user equipment during a second stage of said cooling cycle;
   (k) conduit means for introducing heat transfer fluid withdrawn from said user equipment into upper portion of said first storage vessel;
   (l) conduit means for passing heat transfer fluid from said first storage vessel to said cooling vessel; and
   (m) conduit means for passing heat transfer fluid withdrawn from said user equipment to said cooling means.

2. The apparatus as defined in claim 1 wherein conduit means are provided to by-pass said heating means during finalization of said heating cylce.

3. The apparatus as defined in claim 1 wherein the volume of said vessel is from 75 to 125 percent of the volume of heat transfer conduit means in said user equipment and said conduit means to and from said user equipment.

4. The apparatus as defined in claim 3 wherein said volumes are substantially equal.

* * * * *